United States Patent [19]

Hoshall

[11] 3,839,736

[45] Oct. 1, 1974

[54] RECORD TAPE CARTRIDGES

[76] Inventor: Thomas C. Hoshall, 8300 Brookridge, Oklahoma City, Okla. 73132

[22] Filed: Nov. 24, 1972

[21] Appl. No.: 309,417

[52] U.S. Cl. .............................. 360/132, 360/60

[51] Int. Cl. ......................... G11b 1/00, G11b 23/12

[58] Field of Search ..................................... 274/4 B

[56] References Cited

UNITED STATES PATENTS

| | | | |
|---|---|---|---|
| 1,286,116 | 11/1918 | Rousset | 312/319 |
| 3,650,378 | 3/1972 | Kakiuchi et al. | 274/4 B |
| 3,755,641 | 8/1973 | Rackman | 274/4 B |

*Primary Examiner*—Harry N. Haroian

*Attorney, Agent, or Firm*—Dunlap, Laney, Hessin, Dougherty & Codding

[57] ABSTRACT

The present teachings relate to the employ of a check device in combination with a record tape cartridge which serves to restrict unauthorized recording or playback usage of the record tape container in otherwise standardized recording or reproducing equipment. The check device may consist of any characteristically shaped recess or slot configuration formed integrally with the record container at a predetermined position thereon such that it is disposed in complementary mating relationship relative to a key formation affixed within the tape receiving cavity of the recording or reproducing apparatus.

1 Claim, 8 Drawing Figures

RECORD TAPE CARTRIDGES

BACKGROUND OF THE INVENTION

1. Field of the Invention

The present invention is directed to improvements in audio recording and playback facilities and, more particularly, but not by way of limitation, the invention relates to the provision of a key/slot check structure provided on the respective record container or cartridge and cartridge receiving cavity of the record transducing apparatus.

2. Prior Art

The prior art contains many teachings directed to magnetic record playback and recording wherein a tape cartridge or cassette is utilized to contain the record medium in operative disposition at all times. Early teachings were directed toward actual structure of the cartridge or cassette itself which would enable free movement and reliable cycling of the tape or record medium, and it has now developed that for either of magnetic tape cartridges or cassette contained records, the recording or reproducing apparatus utilizing such structures has been standardized as to form, shape and dimension. That is, many different forms of record tape cartridge or cassette can be utilized with any of various commercially available record transducing equipments.

SUMMARY OF THE INVENTION

The present invention contemplates the provision of mating key and slot check formations interactive between each of the respective endless record tape cartridge and the associated record transducer apparatus. Thus, a characteristically shaped groove, recess or the like formed on the tape record container allows proper and full insertion of the tape record container within the record receiving cavity of the associated transducing apparatus only when the complementary and/or properly shaped key protrusion is affixed at a predetermined position within the receiving cavity.

Therefore, it is an object of the present invention to provide a record tape container which can be transduced only upon authorized and properly constituted transducing equipment.

It is still another object of the present invention to provide stero tape cartridges and cassettes which can be transduced in recording or reproducing equipment only upon satisfaction of a predesignated key/slot check relationship.

Finally, it is an object of the present invention to provide a combination of tape cartridge and record/-playback apparatus which is compatible for operation to the exclusion of all other similar apparatus which does not include the key and/or slot check components.

Other objects and advantages of the invention will be evident from the following detailed description when read in conjunction with the accompanying drawings which illustrate the invention.

DETAILED DESCRIPTION OF THE INVENTION

Figure 1:
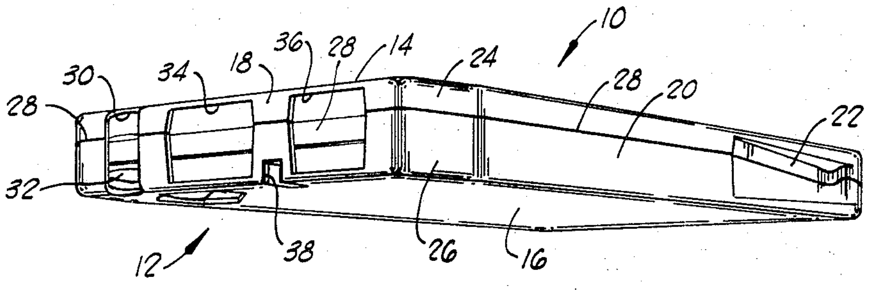
FIG. 1 is a perspective view of a standardized form of eight track stero tape cartridge.
Figure 2:
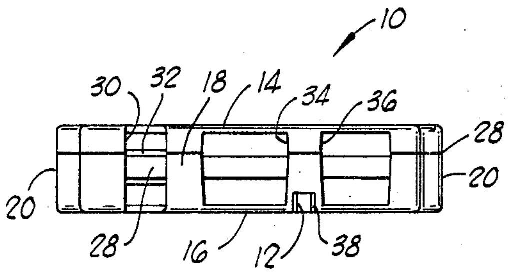
FIG. 2 is a vertical elevation illustrating the front end of a stero tape cartridge as it includes playback/recording access apertures.
Figure 3:
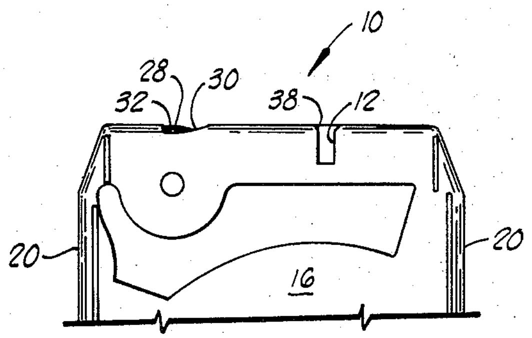
FIG. 3 is a bottom plan view of the front portion of a tape cartridge as shown in FIG. 1.

As shown in FIGS. 1, 2 and 3, a tape cartridge 10 is formed to include a single check slot 12 as formed in the bottom leading or inner edge of cartridge 10. The cartridge 10 may be essentially constructed and shaped as any of the many conventional forms such that it includes an upper panel 14, lower panel 16, leading panel 18, rear panel (not shown), and side panels 20 including oppositely disposed gripping indentations 22. The usual manner of construction of such cartridges is that they be formed most economically from suitable plastics and comprised of an upper portion 24 and lower portion 26 which are joinable along a planar seam 28 while also providing internal locking tabs, pulley supports, tape guide ways, etc.

The leading edge panel 18 includes three operating access apertures which enable engagement of endless tape 28 with the drive and reproducing components of the tape cartridge record/playback apparatus. A drive aperture 30 provides access for the apparatus drive capstan to engage tape 28 adjacent a pinch roller 32 which is rotatably secured within cartridge 10. A tape head aperture 34 provides space whereby the associated apparatus reproducing or recording head may engage record tape 28 when in operational position. Finally, an aperture 36 provides an aperture whereby the associated apparatus end-of-track sensor may engage the tape record 28. As shown in FIG. 2, the check slot 12 is formed at the bottom of leading edge panel 18, a recess of predetermined configuration, and it is preferably formed to have beveled facings 38 which serve to enable more positive operation.

Figure 4:
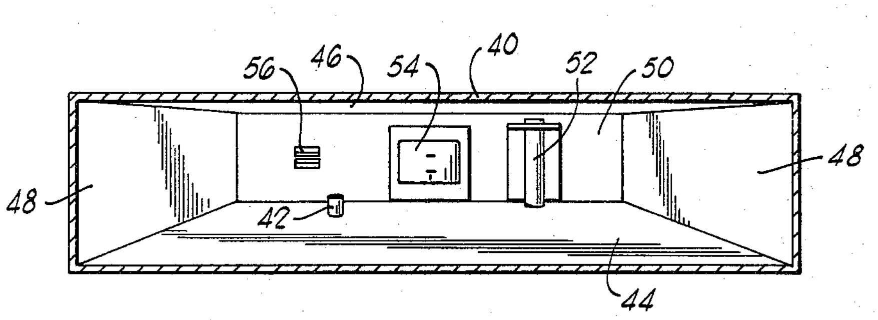
FIG. 4 is a perspective view of the interior of a record receiving cavity of the type utilized with all standardized tape cartridge record/playback apparatus.

FIG. 4 illustrates an internal perspective view of a tape cartridge receiving cavity 40 of conventional configuration save the addition of a check key 42 securely affixed at a predetermined point on the bottom side 44 thereof. The receiving cavity 40 is formed to be of generally rectangular volume similar to the external shape of tape cartridges as defined by the bottom panel 44, top panel 46, side panels 48 and rear panel 50. Mounted adjacent the rear panel 50, or in the general plane of rear panel 50, are the associated drive and reproducing elements of the associated record/playback apparatus. A drive capstan 52 is positioned for engagement of the drive pulley 30 of the tape cartridge 10. A reproducing (or recording as the case may be) transducer head 54 is disposed centrally for operational engagement through the transducer aperture 34 of tape cartridge 10, and an end-of-track sensor 56 is disposed for entry and operational engagement with tape record 28 through aperture 36 of tape cartridge 10. The general layout and operational element positioning, as well as the configuration of tape receiving cavity 40, is a well-standarized design which is utilized by all commercial manufacturers of tape cartridge record/playback equipment.

In operation, however, recording or playback of tape record 28 in tape cartridge 10 can only be performed through utilization of such as receiving cavity 40 having the properly disposed check key 42, as positioned for coactive engagement with check slot 12 to enable proper operational usage. Thus, any unauthorized tape cartridge, even though of the same standardized size and shape as tape cartridge 10, cannot be inserted to operational position within tape receiving cavity 40 unless it is formed to include the necessary and properly positioned check slot 12.

In FIG. 1, the check slot 12 is shown as being disposed on the bottom edge of tape cartridge 10 in the leading edge panel 18 portion lying between apertures 34 and 36; however, it should be understood that there are many choices for slot location so long as tape clearance observations are attended to. That is, a check slot may just as well be placed beneath an aperture portion of the leading edge panel 18 if the ultimate check key positioning is noninterfering with respect to tape record 28.

Figure 5:
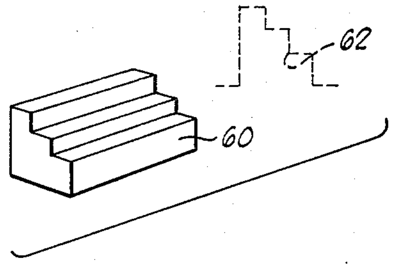
FIG. 5 illustrates an alternative form of key configuration for use in the present invention.
Figure 6:
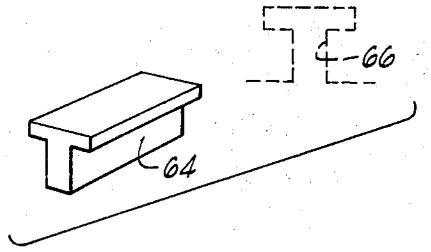
FIG. 6 illustrates in perspective view still another form of key configuration which may be utilized in the present invention.

The check key and slot configuration may be altered variously to enable greater security capabilities to the cartridge-cavity combination. As shown in FIG. 5, formation of a check key as an elongated step configuration, key 60, may be employed with a tape cartridge including a similarly shaped key slot cross-section formed in the tape cartridge, as shown by dashed lines 62. Still another alternative form of check configuration is illustrated in FIG. 6 by the T-shaped elongated check key 64 and an associated cartridge check slot 66.

While unitary check devices have been discussed in the foregoing description, it may also be desirable and, in some cases, even requisite to provide a plural or codable key-slot check structure. Thus, it may be desirable to cause enablement of certain tape record cartridges 10 only for use in specified tape cartridge record/playback equipment; such differentiations in enablement arising from requirements as to tape speed versus quality, enablement of record or reproduce function, satisfaction of customer payment or other requirement, customer classification and separation, etc. Various other requirements of unique nature may be served depending upon the exigencies of the particular need for authorizational use only of tape cartridges and associated recording and reproducing equipments.

Figure 7:
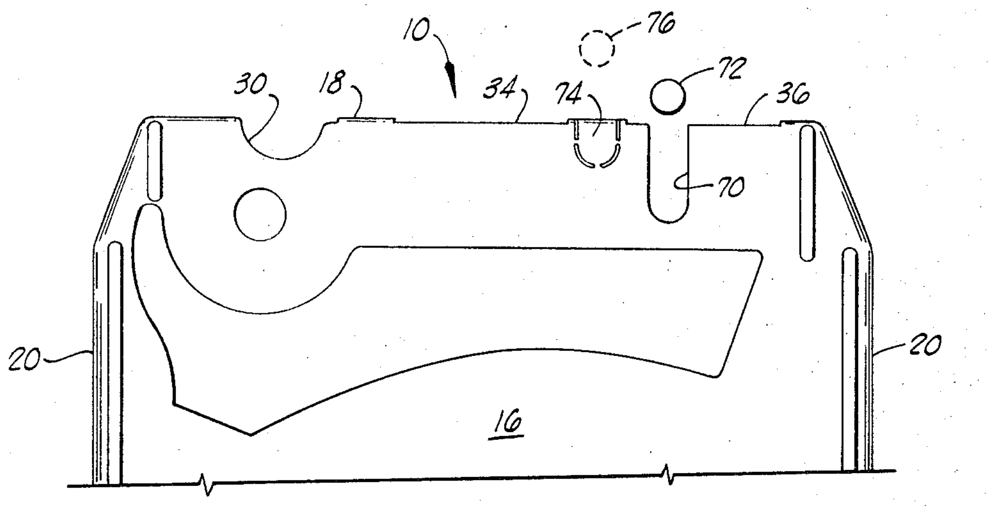
FIG. 7 illustrates a bottom plan view of a portion of a tape record cartridge having plural check slots formed therein.
Figure 8:
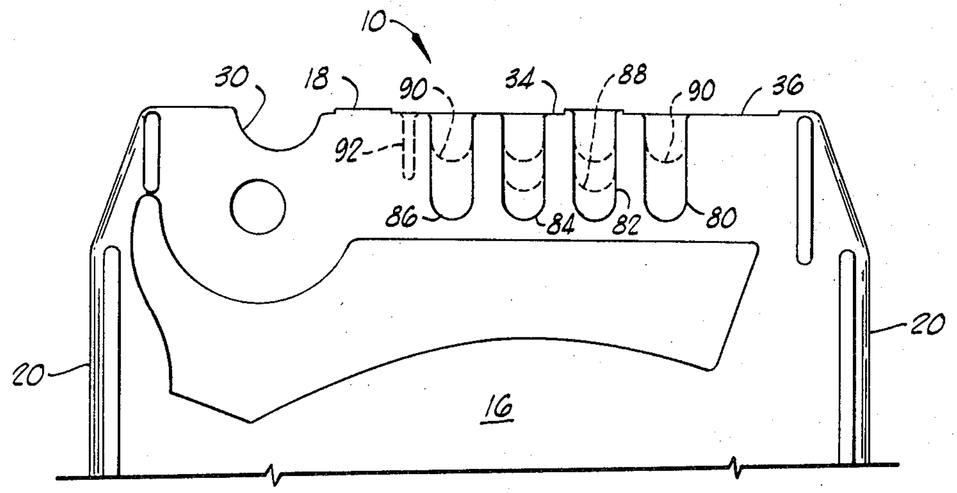
FIG. 8 is a bottom plan view of a portion of a tape record cartridge showing plural check slots for enabling such as binary coded differentiation of authorized usage.

FIG. 7 illustrates a check scheme wherein a full length check slot 70 is initially provided in tape cartridge 10 for coaction with an associated check key 72. In addition, a half length knockout key section or blank 74 is provided so that it may be punched out and utilized with an additional check key 76, as may be suitably positioned within the receiving cavity intended for usage with the particular tape cartridge. Thus, a tape cartridge 10 utilizing a knockout blank 74 serves to extend the authorization differentiation to plural choices. Further differentiation is enabled utilizing such as the scheme outlined in FIG. 8. In this case, the tape cartridge 10 may include a plurality of check slots 80, 82, 84 and 86, each of which may be limited to one of several lengths as shown by dashed-lines 88 and 90.

In the event that a controlling agency desires for some reason to differentiate between a considerable plurality of tape cartridges each authorized for a specific usage, the slots 80 through 86 may be formed in binary coded relationship or other similar form of verification coding such that each selected tape cartridge will be operable only with a properly designated cartridge playback/reproducing equipment. Still further permutative differentiation may be enabled by inclusion of one or more slots as shown by dashed line 92, a check slot of decidedly different slot width than those previously described.

It is also contemplated that with the onset of new television recording techniques and equipmentation, especially the increasing availability of home-type recording apparatus, there will arise a great many applications relative to video record containers or cartridges which may require utilization of the present invention. Accordingly, the teachings herein as to key/slot check methods and equivalents is fully applicable to such video record container or cartridge usage which may utilize the desirable attributes of operation authorization control through container check satisfaction.

Applicant has disclosed herein various forms of key/slot check devices for use in enabling only authorized tape cartridges for playback or recording in specified transducing apparatus. However, it should be understood that the choice of key/slot check methods is dictated merely by concerns as to expediency, economy, ease of manufacture and advantages of maintenance; and that many other forms of device or method may be utilized in providing the same type of check prohibition as to unauthorized catridge-transducer combinations. That is, any of various electronic and/or electromechanical devices may be used such as the sensing of a magnet or magnetic pattern strategically disposed on the tape cartridge, photoelectric aperture or reflector sensing, passive integrated circuit chip response, and various other forms of reaction response mechanism. In addition, any of the foregoing response means may be utilized to provide a large plurality of coded indications for enabling proper operation only on one of a large plurality of transducing equipments.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Check apparatus for use in combination with record tape cartridges and associated transducing apparatus receptacles consisting of a record cartridge receiving cavity for operative positioning of the tape cartridge, comprising:

a plural key configuration consisting of a plurality of keys each formed at a selected rearward position on one surface of said transducer apparatus receiving cavity; and a plural slot configuration formed at a selected position on one surface of said record tape cartridge for knock-out removal of cartridge material to expose said plural slots of selected different cut-out configurations of said cartridge surface which is positioned adjacent said record cartridge receiving cavity inner surface, said plurality of slots being in position to form mating engagement with said plural key configuration thereby to allow complete insertion of said record cartridge into operative transducing relationship within said record cartridge receiving cavity, the number and rearward position of said plural key and plural slot configuration being variable in accordance with a predetermined codification to enable proper operation of only selected tape cartridges with preenable transducing apparatus.

* * * * *